(12) United States Patent
Knebel

(10) Patent No.: US 7,675,617 B2
(45) Date of Patent: Mar. 9, 2010

(54) OPTICAL ARRAY FOR THE SPECTRALLY SELECTIVE IDENTIFICATION OF LIGHT OF A LIGHT BEAM

(75) Inventor: Werner Knebel, Kronau (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 461 days.

(21) Appl. No.: 11/630,342

(22) PCT Filed: Apr. 22, 2005

(86) PCT No.: PCT/DE2005/000739

§ 371 (c)(1),
(2), (4) Date: Dec. 21, 2006

(87) PCT Pub. No.: WO2006/000173

PCT Pub. Date: Jan. 5, 2006

(65) Prior Publication Data

US 2008/0297787 A1    Dec. 4, 2008

(30) Foreign Application Priority Data

Jun. 25, 2004    (DE) .................... 10 2004 031 049

(51) Int. Cl.
*G01J 3/28* (2006.01)
(52) U.S. Cl. .................................................. 356/328
(58) Field of Classification Search .......... 356/326–328
See application file for complete search history.

(56) References Cited

U.S. PATENT DOCUMENTS

| 3,578,980 | A | * | 5/1971 | Decker et al. ........... 250/237 G |
| 4,015,130 | A | * | 3/1977 | Landry et al. ............... 250/372 |
| 5,751,417 | A | | 5/1998 | Uhl |
| 5,886,784 | A | * | 3/1999 | Engelhardt ................... 356/326 |
| 6,204,941 | B1 | | 3/2001 | Beale |
| 6,459,484 | B1 | | 10/2002 | Yokoi |
| 6,614,526 | B1 | | 9/2003 | Engelhardt |
| 2002/0109841 | A1 | * | 8/2002 | Gould et al. ................. 356/318 |
| 2003/0006368 | A1 | * | 1/2003 | Engelhardt et al. .......... 250/234 |

FOREIGN PATENT DOCUMENTS

DE    43 30 347 A1    3/1995
DE    199 02 625 A1    9/1999

* cited by examiner

*Primary Examiner*—Kara E Geisel
(74) *Attorney, Agent, or Firm*—Foley & Lardner LLP

(57) ABSTRACT

Disclosed is an optical array (2) for the spectrally selective identification of light of a light beam, particularly for identifying light of a detecting light beam (3) in a preferably confocal scanning microscope (1). Said optical array comprises a means (18) for the spatial spectral decomposition of the light beam, means for selecting a given continuous spectral range, and a detector (28). The inventive optical array (2) is characterized by at least one blocking element (25, 26, 27) which can be introduced into the light beam in order to stop down a given partial spectral region located within the selected continuous spectral range.

11 Claims, 2 Drawing Sheets

Figure 1:
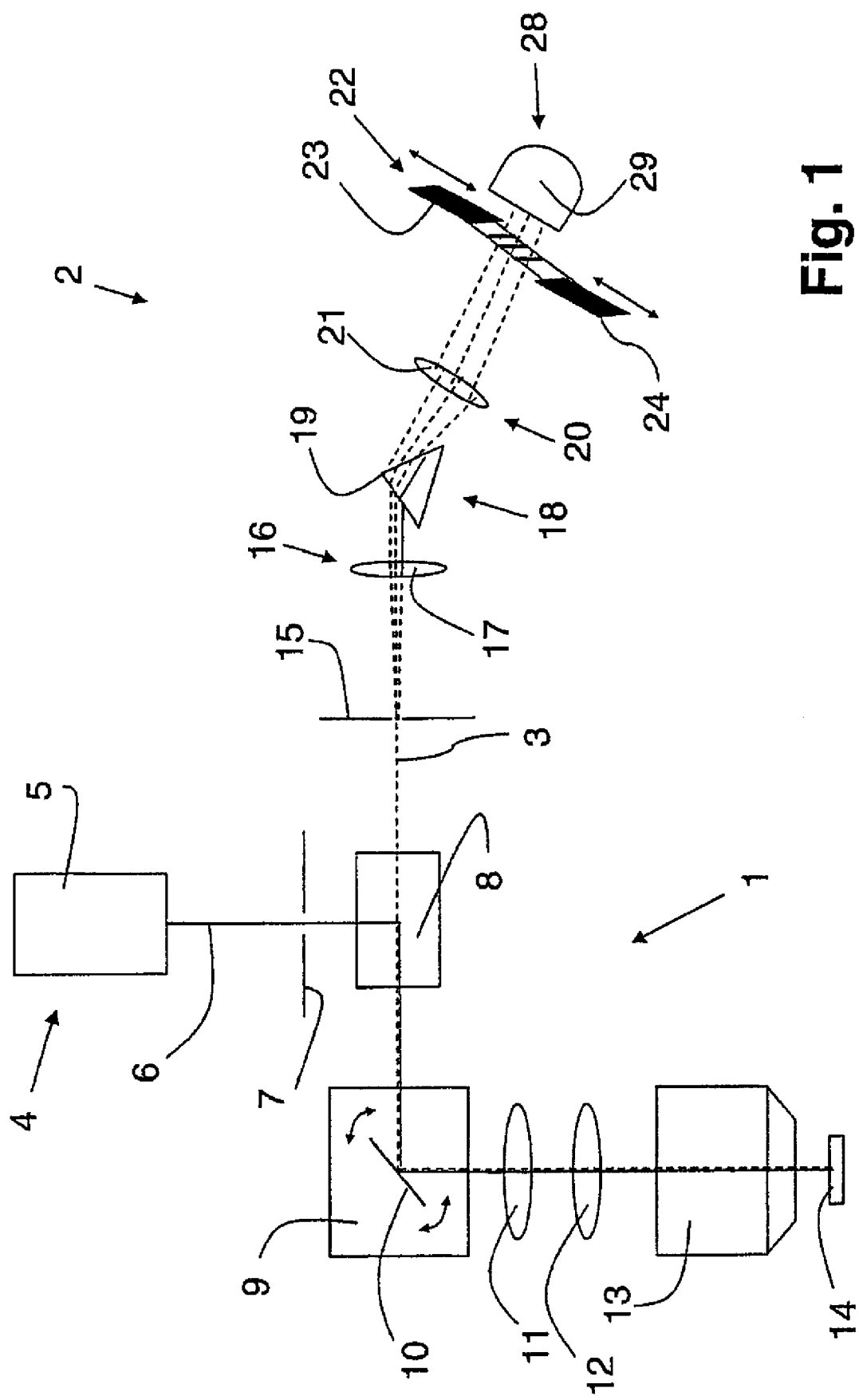

OPTICAL ARRAY FOR THE SPECTRALLY SELECTIVE IDENTIFICATION OF LIGHT OF A LIGHT BEAM

The invention relates to an optical array for the spectrally selective identification of light of a light beam, in particular for the identification of light of a detection light beam in a preferably confocal scanning microscope, comprising a means for the spatial spectral decomposition of the light beam, comprising selection means for selecting a predeterminable continuous spectral range, and comprising a detector.

In scanning microscopy, a sample is illuminated with a light beam and the reflection or fluorescent light emitted by the sample is fed to suitable detection means. The illumination light beam is passed in meandering fashion over the sample by means of a beam deflecting device, which is generally a mirror that can be tilted in two mutually perpendicular directions. The light issuing from the sample is measured as a function of the position of the illumination light beam.

Optical arrays of the type mentioned in the introduction are already known for the spectrally selective identification of the light issuing from the sample. DE 199 02 625 A1 discloses, for example, an optical array in which different wavelength components can be identified simultaneously by means of a so-called multiband detector. What is disadvantageous in the case of an array of this type is that the multiband detectors used are very complicated and accordingly very expensive. They afford the possibility of multichannel detection, but this is not required for many applications. In this respect, a single-channel detection system is preferable for numerous microscopic examination methods.

Optical arrays of the type mentioned in the introduction in which single-channel spectral detectors are used are likewise already known. DE 101 56 695 discloses a scanning microscope in which, by means of two adjustable diaphragms, a lower limiting wavelength and an upper limiting wavelength can be predetermined in such a way that light components of the detection light having wavelengths less than the lower limiting wavelength or having wavelengths greater than the upper limiting wavelength are blocked by the diaphragms. The position of the diaphragms may in this case be set for example in such a way that residual components of the illumination light that are present in the detection beam path are blocked.

The known apparatus proves to be disadvantageous particularly in connection with experiments in which a sample stained with a plurality of fluorochromes is intended to be scanned sequentially with different laser lines. During the detection, the diaphragms then have to be displaced in rapid succession for adaptation to the respective spectral detection range and for masking out residual components of the illumination light. However, the maximum possible speed at which the diaphragms can be displaced is at best sufficient for frame by frame multicolor detection. If, by contrast, the sample is intended to be scanned line by line with different laser lines, the diaphragms prove to be too slow with regard to their displaceability.

The present invention is based on the object, then, of configuring and developing an optical array of the type mentioned in the introduction in such a way that using simple means, both a multicolor detection with sequential scan—frame by frame or line by line—and a λ scan can be carried out with high accuracy.

According to the invention, the above object is achieved by means of the features of patent claim 1.

Accordingly, the optical array in question is formed in such a way that provision is made of at least one blocking element which can be introduced into the light beam in order to mask out a predeterminable spectral subrange lying within the selected continuous spectral range.

In the manner according to the invention it has initially been recognized that the use of multiband detectors for the spectrally sensitive identification of light of a light beam often makes the corresponding apparatus unnecessarily complicated in its construction and expensive to produce. What is more, it has been recognized that a spectrally sensitive identification can be carried out in a surprisingly simple manner using a single-channel detector system if specific spectral subranges are masked out in the light beam to be detected. According to the invention, at least one blocking element which can be introduced into the light beam is provided for this purpose. The blocking element introduced into the light beam enables high flexibility with regard to the spectral selection of the wavelength components to be identified and furthermore permits rapid adaptability, as is necessary—as explained in the introduction—for example during a multicolor detection with line by line sequential scan.

In one preferred embodiment, the selection means are embodied as a slit diaphragm arrangement. In concrete terms, the slit diaphragm arrangement may comprise a first diaphragm for masking out light components having wavelengths above an upper limiting wavelength and a second diaphragm for masking out light components having wavelengths below a lower limiting wavelength.

In an advantageous manner, the positions of the diaphragms relative to the detector could be able to be altered independently of one another. As a result, it is possible to freely choose both the width of the selective spectral range and the absolute position thereof within the spectrally fanned-out light beam to be detected. In the context of a concrete application, the two diaphragms could be moved together for example for a λ scan to an extent such that only a spectral range with a width approximately 5 nm can pass through the diaphragm aperture. The diaphragm aperture can be displaced image by image in steps of a few nm. A spectral profile can be determined for each pixel from the data record obtained. In order to examine a sample labeled with a plurality of fluorochromes, the two diaphragms could be positioned for a multicolor detection with sequential scan in such a way that a spectral range having a width of approximately 50 nm can pass through the diaphragm aperture.

A focusing optic for generating a focal plane is advantageously disposed downstream of the means for the spectral decomposition of the light beam. In the simplest case, the focusing optic may be a converging lens. Both the slit diaphragm arrangement and the blocking elements could be positioned in the focal plane in order, in this way, to obtain masking-out edges that are as sharply distinct as possible.

In one preferred refinement, the positions of the blocking elements in the light beam can be altered. In this case, a position alteration may be provided, on the one hand, within the splitting plane in order to mask out different spectral ranges. On the other hand, a position alteration may be provided in the sense of a complete advance into or withdrawal from the beam path. Thus, by way of example, the number of blocking elements advanced into the light beam to be detected could be coordinated with the number of different laser lines with which the microscope system is operated. Consequently, given a total of three different laser lines, three blocking elements could correspondingly be provided in the light beam. If excitation light having one wavelength which remains in the light beam is already masked out by one of the two diaphragms of the slit diaphragm arrangement, then it may suffice to introduce only two blocking elements into the light beam.

With regard to particularly fast adaptability of the blocking elements, it is advantageous for the blocking elements to be embodied in tiltable fashion. By way of example, a stepper motor, a piezomotor or a galvanometer may be provided as drive means for rotating the blocking elements. In this case, the blocking elements could be embodied as thin webs. The latter are positioned with their broad side in the light beam if the corresponding spectral range is intended to be masked out. If, by contrast, the corresponding spectral range is intended to be transmitted to the detector, the webs are tilted, so that their narrow side is situated in the light beam. In concrete terms, the width of the webs could be of the order of magnitude of 50 to 100 μm. In the case of spectral splitting where the visible spectral range between 400 and 800 nm has a spatial extent of 20 mm in the focal plane, this corresponds to a spectral width of 1 to 2 nm. On the other hand, the thickness of the webs could be of the order of magnitude of just 10 μm, so that the blocking elements have only little disturbing effect within the spectrum in a position in which the narrow side is situated in the light beam.

In order to prevent the information content of the spectral ranges that are masked out by means of the blocking elements from being completely lost, the blocking elements may advantageously be mirror-coated. In addition, provision may be made of a photodetector, onto which the masked-out wavelength components can be reflected by means of the mirror-coated blocking elements. The photodetector may be arranged at a fixed angle with respect to the blocking elements and could be used for calibration purposes or for online control measurements.

In one preferred embodiment, the means for the spectral decomposition of the light beam is embodied as a dispersive element. In particular the use of a prism or a grating is suitable on account of the simple handleability. In the case of a prism it is necessary to take account of the nonlinearity of the spectral splitting, but this does not constitute a problem on account of the individual positionability and tiltability of the blocking elements.

On account of its extremely good time response, a photomultiplier is preferably used as the detector. The use of other types of detector, in particular the use of avalanche photodiodes (APD), is additionally conceivable. APDs are characterized by their high sensitivity and usually have a small detection area.

Figure 2:
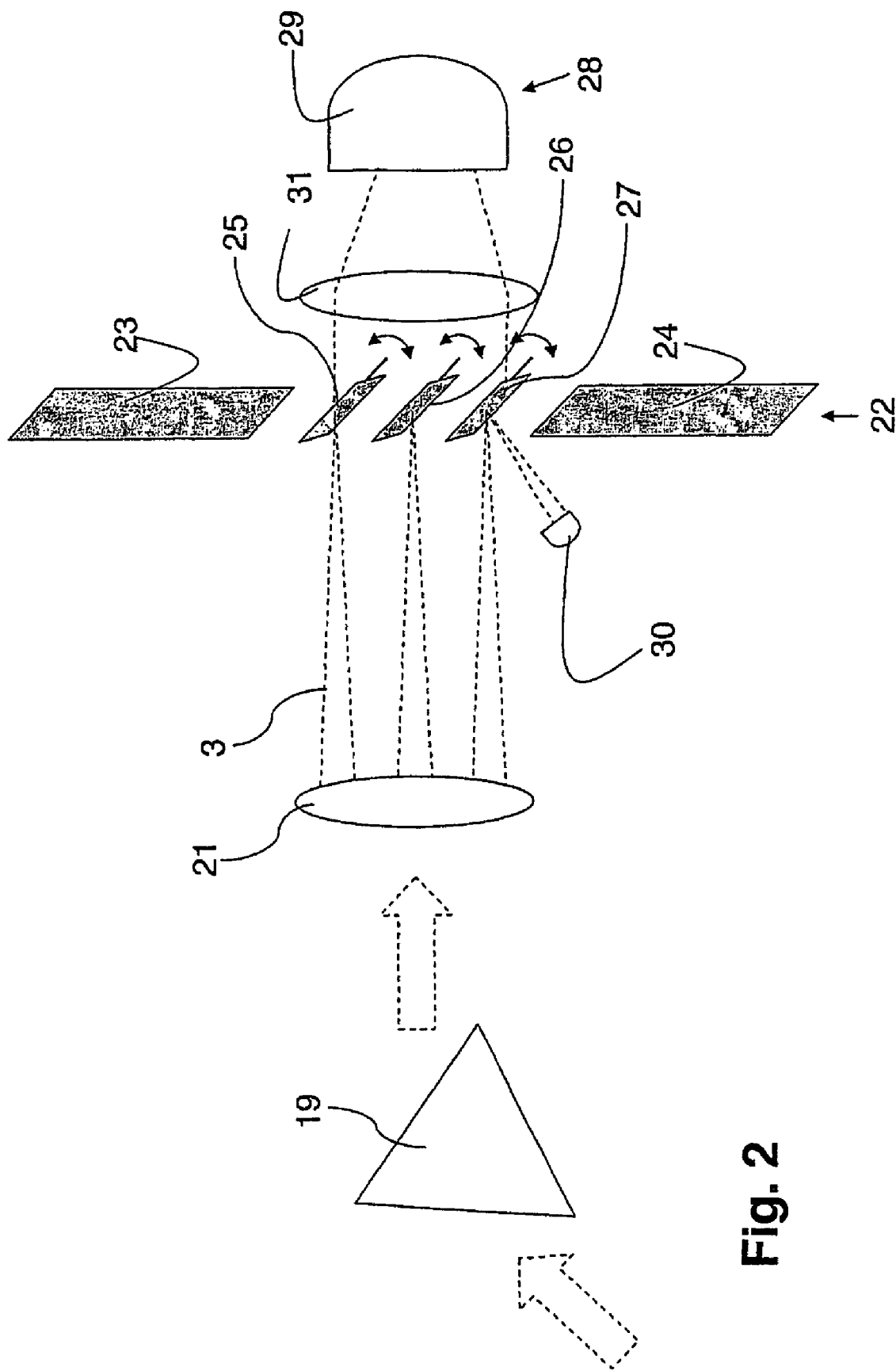

There are various possibilities, then, for configuring and developing the teaching of the present invention in an advantageous manner. In this respect, reference should be made, on the one hand, to the patent claims subordinate to patent claim 1 and, on the other hand, to the following explanation of a preferred exemplary embodiment of the invention with reference to the drawing. Preferred refinements and developments of the teaching are also generally explained in conjunction with the explanation of the preferred exemplary embodiment of the invention. In the drawing:

FIG. 1 shows a schematic view of a confocal scanning microscope with an optical array according to the invention for the spectrally selective identification of light of the detection light beam of the scanning microscope, and FIG. 2 shows an enlarged view of the optical array from FIG. 1.

FIG. 1 shows—schematically—the basic construction of a confocal scanning microscope 1, the scanning microscope 1 having an optical array 2 for the spectrally selective identification of light of the detection light beam 3.

The scanning microscope 1 comprises a laser 5 as light source 4, said laser emitting an illumination light beam 6. After passing through an excitation diaphragm 7, the illumination light beam 6 is reflected from a beam splitter 8 to the scanning module 9, which has a cardanically suspended scanning mirror 10, which guides the beam through a scanning optic 11, a tube optic 12 and a microscope optic 13 over or through a sample 14. The illumination light beam 6 coming from the light source 4 is illustrated as a solid line in FIG. 1.

The detection light beam 3 issuing from the sample 14 and illustrated by dashed lines passes through the microscope optic 13, the tube optic 12, the scanning optic 11 via the scanning module 9 to the beam splitter 8. After passing through a detection diaphragm 15, the detection light beam 3 impinges on a first focusing optic 16, which is embodied as a lens 17. The detection light beam 3 then impinges on a means 18 for spatially spectral decomposition, which is embodied as a prism 19. The spectrally fanned-out detection light beam 3 is focused into a focal plane by means of a second focusing optic 20, which is arranged behind the prism 19 and is embodied as a lens 21.

A slit diaphragm arrangement 22 formed from two diaphragms 23, 24 is positioned in the focal plane. A total of three blocking elements 25, 26, 27 are arranged between the two diaphragms 23, 24. Upon passing through the slit diaphragm arrangement 22 and also the blocking elements 25, 26, 27, specific predeterminable spectral ranges are masked out from the detection light beam 3, as is explained in detail below with reference to FIG. 2. The wavelength components remaining in the detection light beam 3 after passing through the slit diaphragm arrangement 22 and also the blocking elements 25, 26, 27 are identified in the detector 28, which is embodied as a photomultiplier 29.

FIG. 2 shows—schematically—the fundamental operation of masking out specific wavelength components from the detection light beam 3 by means of the diaphragms 23, 24 and the blocking elements 25, 26, 27 in greater detail. Identical reference symbols designate structural parts identical to those in FIG. 1. As already explained above, after passing through the prism 19, the detection light beam 3 is focused into a focal plane by the lens 21. The two diaphragms 23, 24 are arranged in the focal plane and a predeterminable continuous spectral range can be selected by means of said diaphragms. In this case, diaphragm 23 blocks light components having wavelengths greater than an upper limiting wavelength defined by the position of the diaphragm 23. Diaphragm 24 analogously blocks light components having wavelengths less than a lower limiting wavelength likewise determined by the position of the diaphragm 24. In order to alter the upper and lower limiting wavelengths, the diaphragms 23, 24 can be displaced—as indicated by the two double arrows in FIG. 1.

Three blocking elements 25, 26, 27 are arranged between the diaphragms 23, 24 and predeterminable spectral sub-ranges lying within the spectral range selected by means of the diaphragms 23, 24 can be masked out from the detection light beam 3 by means of said blocking elements. The blocking elements 25, 26, 27 are formed as thin webs having a width of approximately 50 to 100 μm and a thickness of approximately 10 μm. By means of a galvanometer (not illustrated), the webs can be tilted about their axis indicated by the double arrows. If a blocking element 25, 26, 27 is oriented with its narrow side toward the photomultiplier 29, then the detection light beam 3 is virtually uninfluenced. For the case where a specific spectral range is intended to be masked out, the corresponding blocking element 25, 26, 27 is tilted—for example through 90°—, so that it is oriented with its broad side toward the detection light beam 3.

In the exemplary embodiment illustrated in FIG. 2, a lens 31 is arranged between the slit diaphragm arrangement 22 and the detector 28. The lens 31 concentrates the detection light, so that the latter can also be imaged on detectors having a relatively small active detection area—such as e.g. APDs.

In order to adapt the array flexibly both to different experimental parameters and to different microscope systems with, by way of example, different illumination laser lines, the blocking elements 25, 26, 27 can be displaced in the direction of the focal plane, so that in each case different spectral ranges can be masked out. Furthermore, the blocking elements can also be exchanged from application to application and be replaced for example by narrower or wider blocking elements.

Blocking element 27 is embodied in mirror-coated fashion. The wavelength components of the detection light beam 3 which are reflected from the blocking element 27 impinge on a photodetector 30 positioned at a corresponding angle and are detected there for calibration purposes or for online control measurements.

Finally, it should especially be pointed out that the exemplary embodiment discussed above merely serves for describing the claimed teaching, but does not restrict the latter to the exemplary embodiment.

The invention claimed is:

1. An optical array for the spectrally selective identification of light of a light beam, comprising
    optics for the spatial spectral decomposition of the light beam;
    a selector for selecting a predeterminable continuous spectral range of the decomposed light beam;
    a detector for detecting light from the selected spectral range of the decomposed light beam;
    at least one blocking element which can be introduced into the light beam prior to the detector, in order to mask out a predeterminable spectral subrange lying within the selected continuous spectral range; and
    wherein the position of the at least one blocking element in the light beam can be altered;
    wherein the at least one blocking element is embodied in tiltable fashion;
    wherein the at least one blocking element is embodied as a thin web;
    wherein the at least one blocking element is mirror-coated; and
    further comprising a photodetector, onto which wavelength components masked out by the at least one blocking element can be reflected.

2. The array as claimed in claim 1, wherein the selector comprises a slit diaphragm arrangement.

3. The array as claimed in claim 2, wherein the slit diaphragm arrangement comprises a first diaphragm for masking out light components having wavelengths above an upper limiting wavelength and a second diaphragm for masking out light components having wavelengths below a lower limiting wavelength.

4. The array as claimed in claim 3, wherein the positions of the diaphragms relative to the detector can be altered independently of one another.

5. The array as claimed in claim 1, wherein a focusing optic for generating a focal plane is disposed downstream of the optics for the spectral decomposition of the light beam.

6. The array as claimed in claim 5, wherein the at least one blocking element and a slit diaphragm arrangement are positioned in the focal plane.

7. An optical array for the spectrally selective identification of light of a light beam, comprising
    a means for the spatial spectral decomposition of the light beam;
    selection means for selectin a predeterminable continuous spectral range of the decomposed light beam;
    a detector for detecting light from the selected spectral range of the decomposed light beam; and
    at least one blocking element which can be introduced into the light beam prior to the detector, in order to mask out a predeterminable spectral subrange lying within the selected continuous spectral range;
    wherein the blocking elements are embodied as thin webs; and
    wherein the webs have a width of the order of magnitude of 50-100 µm.

8. An optical array for the spectrally selective identification of light of a light beam, comprising
    a means for the spatial spectral decomposition of the light beam;
    selection means for selecting a predeterminable continuous spectral range of the decomposed light beam;
    a detector for detecting light from the selected spectral range of the decomposed light beam; and
    at least one blocking element which can be introduced into the light beam prior to the detector, in order to mask out a predeterminable spectral subrange lying within the selected continuous spectral range;
    wherein the blocking elements are embodied as thin webs; and
    wherein the webs have a thickness of the order of magnitude of 10 µm.

9. The array as claimed in claim 1, wherein the detector comprises a photomultiplier or an avalanche photodiode (APD).

10. The array as claimed in claim 1, wherein the optics for the spectral decomposition of the light beam comprises a dispersive element.

11. The array as claimed in claim 10, wherein the dispersive element comprises a prism or a grating.

* * * * *